United States Patent [19]

Tisserand et al.

[11] Patent Number: 5,474,636
[45] Date of Patent: Dec. 12, 1995

[54] METHOD FOR THE PLASTIFICATION OF DOCUMENTS PUNCHED OUT OF A SHEET

[75] Inventors: Georges Tisserand, La Ferte Faucher; Jacques Tisserand, Chelles, both of France

[73] Assignee: Thomson-CSF, Paris, France

[21] Appl. No.: 160,905

[22] Filed: Dec. 3, 1993

[30] Foreign Application Priority Data

Dec. 15, 1992 [FR] France .................................. 92 15083

[51] Int. Cl.⁶ .............................. B32B 31/10; B32B 31/18
[52] U.S. Cl. .......................... 156/261; 156/252; 156/265; 156/269; 156/297; 156/300; 156/301; 83/33; 83/39; 83/50
[58] Field of Search ...................... 156/261, 265, 156/511, 513, 252, 268, 518, 297, 301; 83/30, 33, 39, 50

[56] References Cited

U.S. PATENT DOCUMENTS

| | | | |
|---|---|---|---|
| 2,857,966 | 10/1958 | Sarka | 83/33 |
| 4,208,231 | 6/1980 | Hoppe et al. | 156/247 |
| 4,383,882 | 5/1983 | Held | 156/552 |
| 4,456,667 | 6/1984 | Bochow et al. | 156/241 X |
| 4,560,426 | 12/1985 | Moraw et al. | 156/250 X |
| 4,696,210 | 9/1987 | Cain et al. | 83/33 |
| 4,878,971 | 11/1989 | Tsunekawa et al. | |
| 4,999,065 | 3/1991 | Wilfert | 156/277 X |
| 5,019,314 | 5/1991 | Burlando | 83/50 X |
| 5,252,167 | 10/1993 | Hoppe et al. | 156/261 |

FOREIGN PATENT DOCUMENTS

3232060A1   3/1983   Germany.

Primary Examiner—James Engel
Assistant Examiner—M. Curtis Mayes
Attorney, Agent, or Firm—Oblon, Spivak, McClelland, Maier & Neustadt

[57] ABSTRACT

In a method for the plastification of documents punched out of a sheet, with a plastic cover being fixed to a document, at least two first reference markers are made on the cover, the positions of the first reference markers being defined beforehand with respect to the punch-out line of the document. The position of the punch-out line of the unit constituted by the document and the cover being defined beforehand with respect to at least two reference markers, the unit is punched out when the first and second reference markers coincide. Application to the plastification of all printed documents.

5 Claims, 5 Drawing Sheets

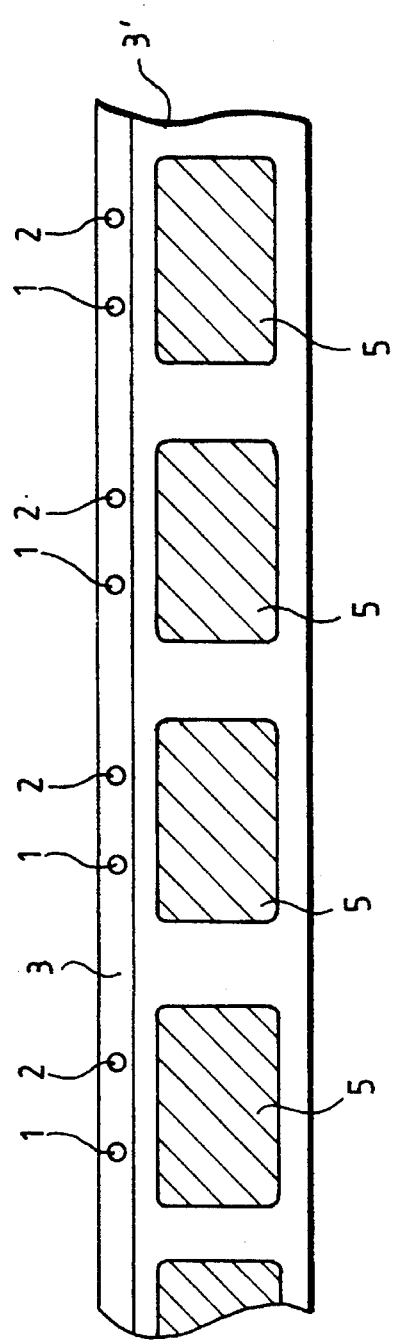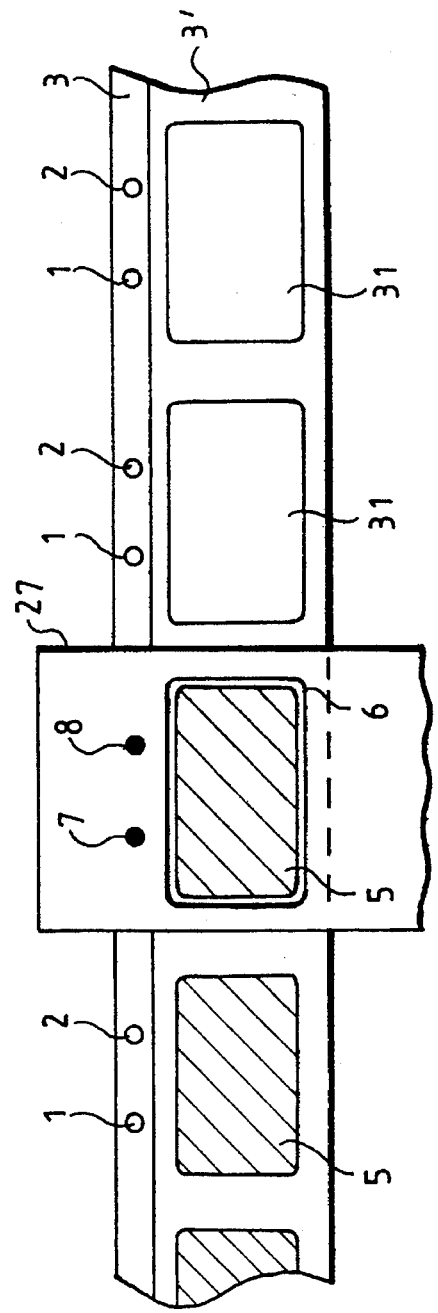

METHOD FOR THE PLASTIFICATION OF DOCUMENTS PUNCHED OUT OF A SHEET

BACKGROUND OF THE INVENTION

The present invention relates to a method for the plastification of documents cut out or punched out of a sheet. It can be applied notably to the plastification of original documents such as identity cards or any other identity documents for example. More generally, it can be applied to the plastification of documents printed on a sheet, the condition of which must be protected for reasons of security or reliability.

The quality of plastification of identity documents plays a role notably in the security and reliability that these documents must provide. Different criteria together define this quality. Among these criteria, the evenness of the plastic edges plays a major role. For it is important that the document, for example a rectangular identity card, should be well centered in the middle of the plastic rectangle that covers it for reasons of automatic recognition or of the reliability of the document for example.

There are known methods of plastification that can be used to obtain the last-named criterion of quality. However, these methods are implemented by means of complex and costly machines, suited notably to centralized production systems that process large quantities of documents. These machines notably make use of automatic machines for localizing the position of the cards in relation to the plastic bands that cover them. This localization is done, for example, in relation to the edges of the document to be plastified. These machines also make use of means for punching through plastic covering bands.

Another known means consists in positioning the documents by hand and in checking their positioning visually. Apart from the risks of positioning errors inherent in this type of human activity, a method such as this is incompatible with a production rate of more than a few units.

SUMMARY OF THE INVENTION

The aim of the invention is to overcome the above-mentioned drawbacks, notably by making it possible to obtain even plastic edges in a simple and reliable way.

To this effect, an object of the invention is a method for the plastification of a document punched out of a sheet by means for punching out along a first punch-out line, wherein:

- in a first step, at least one plastic cover being fixed to the document, at least two reference markers are made on the cover, the positions of the first reference markers being defined beforehand with respect to the punch-out line of the document whose position on the cover is defined with respect to this punch-out line;
- in a second step, the position of the punch-out line of the unit constituted by the document and the cover being defined beforehand with respect to at least two second reference markers, the document/cover unit is punched out when the first and second reference markers coincide.

The main advantages of the invention are that it can be adapted to all types of production of plastified documents, notably on a semi-industrial scale and that it is simple to implement and economical.

BRIEF DESCRIPTION OF THE DRAWINGS

Other characteristics and advantages of the invention will appear from the following description, made with reference to the appended drawings, of which:

FIGS. 3a, 3b and 4 show an application comprising several documents to be plastified.

DESCRIPTION OF THE INVENTION

Figure 1A:
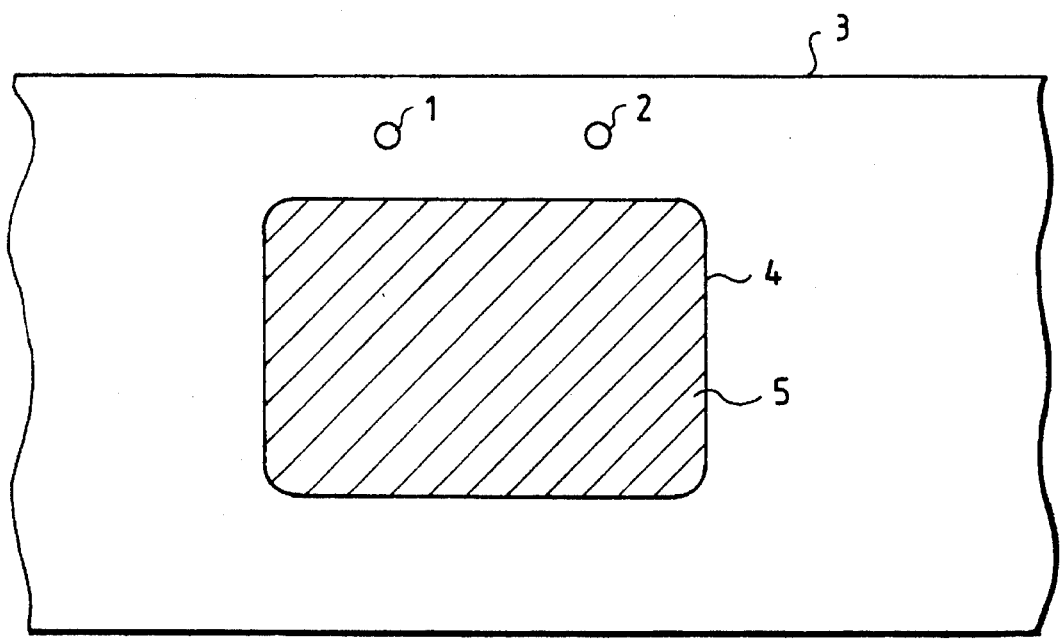
FIGS. 1a, 1b, 1c are illustrations of the principle of the method according to the invention.
Figure 1B:
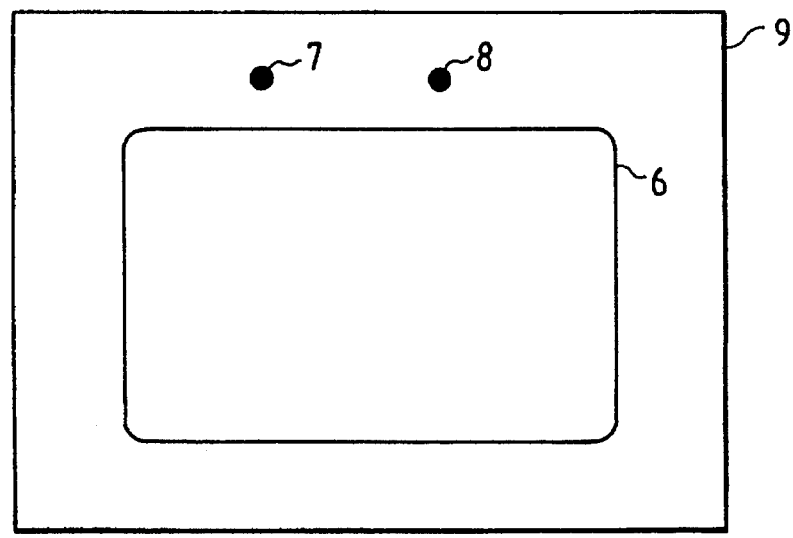
Figure 1C:
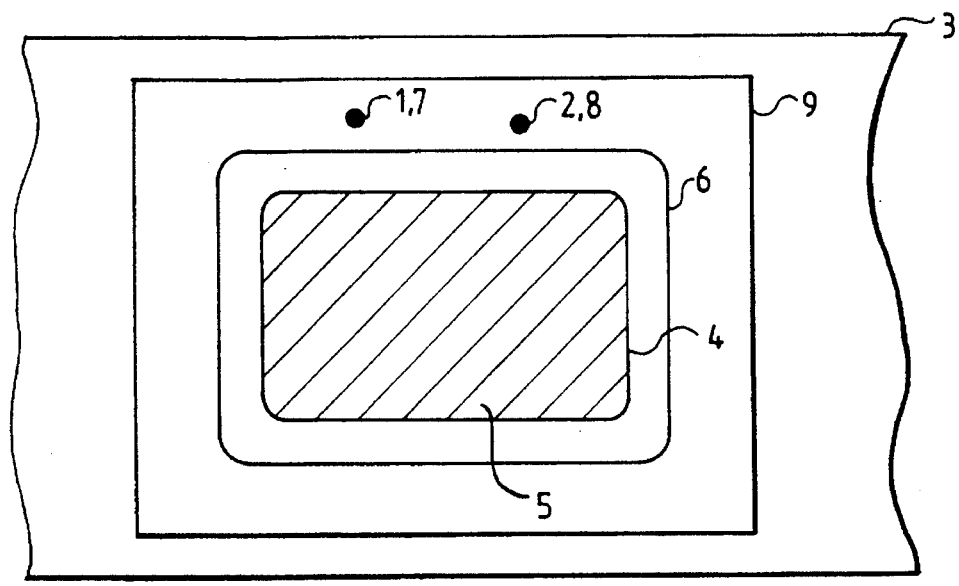

FIGS. 1a, 1b and 1c illustrate the principle of the method according to the invention.

FIG. 1a shows a document 5, fixed to a first plastic cover 3, which is a plastic band for example. At least two reference markers 1, 2, which are for example points, are made on the first cover 3. The positions of the first reference markers 1, 2 are defined beforehand with respect to a first punch-out line 4 which is the line for punching out the document to be plastified, this document being punched out of a sheet prior to plastification. The document is fixed to the first cover 3, preferably inside the punch-out line 4. This can be obtained, for example, by placing the first cover 3 just at the outlet of a die for the punching out of the document 5. It is not obligatory for the document 5 to remain inside its punch-out line 4. However, its position on the first cover 3 should be defined with respect to the punch-out line 4. Before or after the first reference markers 1, 2 are made on the first cover 3, a second cover made of plastic (not shown) is fixed to the back of the document 5. If the second cover is fixed after the first reference markers have been made, then this is done in such a way that these reference markers are not hidden. If the second cover is fixed before the first reference markers have been made, then these marks can be made, for example, on both covers together. The covers can be fastened to the document, for example by heat spots.

FIG. 1b shows a second punch-out line which is the line for punching out the unit constituted by the document and its two plastic covers. This second punch-out line 6 for example corresponds to the edges of a die or a punch. The position of the second punch-out line 6 is fixed and is defined with respect to at least two second reference markers 7, 8 for example, located on a punch-out module 9 comprising the second punch-out line 6. These two reference markers 7, 8 are points for example. The relative positions of the second reference markers 7, 8 are identical to the relative positions of the first reference markers 1, 2.

FIG. 1c shows the superimposition of the punch-out module 9 and of the unit formed by the document 5 and its plastic covers, of which only one (referenced 3) is shown. The second punch-out line 6 for punching out the unit 3, 5 surrounds the first punch-out line 4 of the document. According to the invention, in order to obtain even plastic edges around the plastified document 5, the unit formed by the document and its covers will be punched out only when the first reference markers 1, 2 coincide with the second reference markers 7, 8, the positions of the first reference markers 1, 2 with respect to the first punch-out line 4 and the position of the second punch-out line 6 with respect to the positions of the second reference markers 7, 8 having been defined so as to obtain this evenness. However, these positions could be defined beforehand so as to obtain a different positioning of the document with respect to its plastic protection, for example so as to obtain plastic edges with widths that differ from one side to the other. The first punch-out line 4 may be, for example, inside the second punch-out line 6 as illustrated in FIG. 1c.

However, these two punch-out lines may be merged into one line if plastic edges are not desired. The second punch-out line 6 may also, for example, be inside the first punch-out line 4. In this case the document is punched out once again. Once the relative positions of the first reference markers with respect to each other and the relative positions of the second reference markers with respect to each other are identical, the first reference markers on the first plastic cover may take any position with respect to the first punch-out line 4 for punching out the document 5, provided that these positions are fixed and defined with respect to this first punch-out line 4. The first reference markers may be, for example, inside this line 4, hence inside the document 5 for example. The first reference markers 1, 2 and second reference markers 7, 8 may be, for example, holes or marker dots.

Figure 2A:
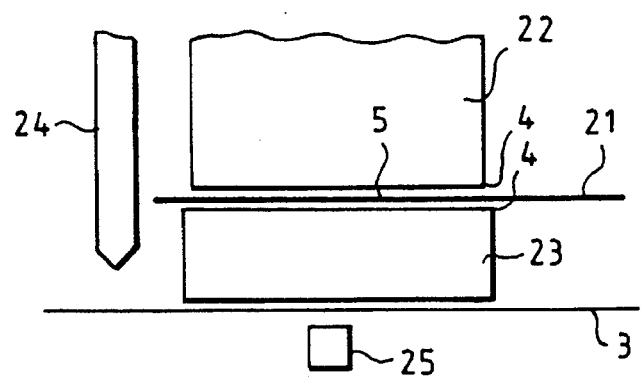
FIGS. 2a, 2b, 2c and 2d exemplify a possible implementation of the method according to the invention.

FIGS. 2a to 2d show an exemplary possible implementation of the method according to the invention. FIG. 2a shows a sheet 21 placed between a first punch 22 and its associated die 23. The punching out of the document 5 contained in the sheet 21 is obtained by the passage of the first punch 22 through its die 23, the document 5 being placed between these two elements 22, 23. Two auxiliary punches are connected to the first punch 22. Of these two auxiliary punches, only one (referenced 24) is shown, the other one being hidden by it.

The positions of the auxiliary punches 24 and of the first punch 22 are fixed with respect to each other in a plane perpendicular to that of their common direction of movement. Since the first plastic cover 3 has to be fixed to the front of the document 5, it is placed for example just beneath, in contact with the the die 23 so that, at the outlet of this die, the document 5 pushed by the first punch 22 is positioned directly on this first cover 3. This makes it possible notably to keep the position of the document 5 well within its punch-out line 4 constituted by the facing edges of the first punch 22 and its die 23. When the document 5 is being placed on the first cover 3, a heating element 25, located in the vicinity of this first cover 3 and beneath it, can be used for example to attach it to the document by a heat spot. The total plastification of the front of the document can be done, for example, subsequently.

The first cover 3 is, for example, a plastic band with its adhesion face, pointed towards the document to be plastified, being made of polyethylene for example and its external face being made of polyester for example, the temperature of the latter material being insensitive to the sealing temperature of the adhesion face. The cover may be any other plastic material that is heat-sealing for example by means of systems known to those skilled in the art. Should the first cover 3 be constituted by a plastic band moving past under the die 23, the band cannot be located just below, in contact with the die 23, for reasons of friction notably. Since a spacing is made between the die and the tape, it is possible to provide for a system that raises this band when a document is coming out of the die 23, the band being then in contact with this die 23 when the document is positioned.

Figure 2B:
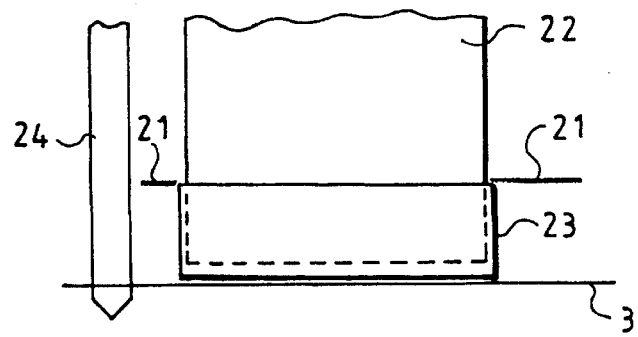

Simultaneously with the passage of the first punch 23 into its die 23, hence simultaneously with the punching out of the document 5, the auxiliary punches 24 move in the same direction as the first punch 22 so as to pierce two holes in the first cover 3 as illustrated in FIG. 2b, these holes acting as the above-mentioned first reference markers 1, 2.

Figure 2C:
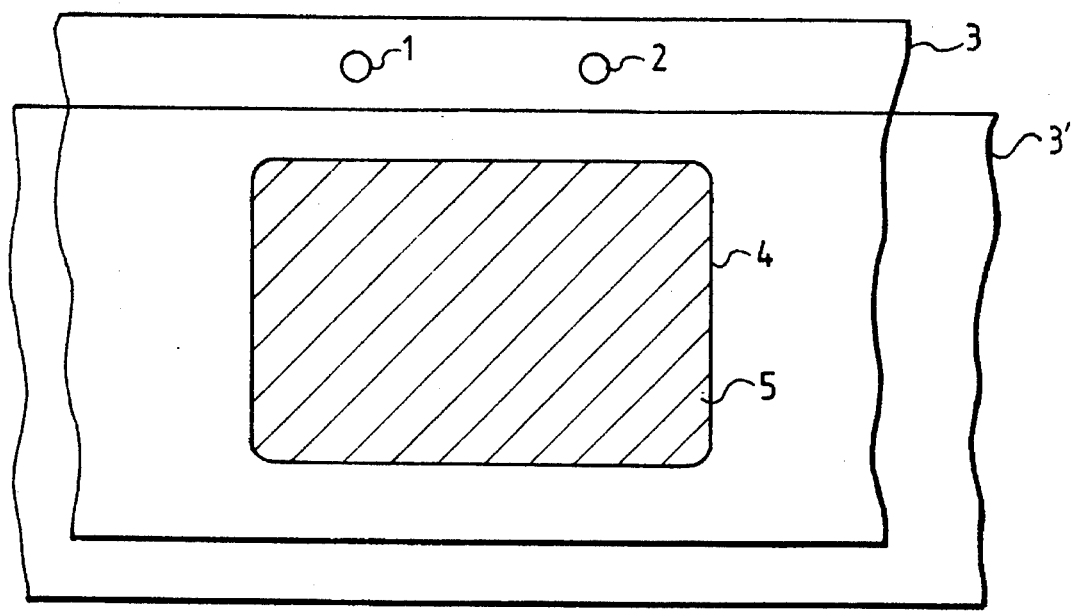

FIG. 2c shows an exemplary positioning of a second plastic cover 3' on the back of the document 5, the holes 1, 2 having been made on the first cover 3 and this first cover 3 being fixed to the front of the document 5. The second cover 3' is, for example, fixed to the document 5 so that it does not cover the holes 1, 2 and so that it covers the document entirely.

Figure 2D:
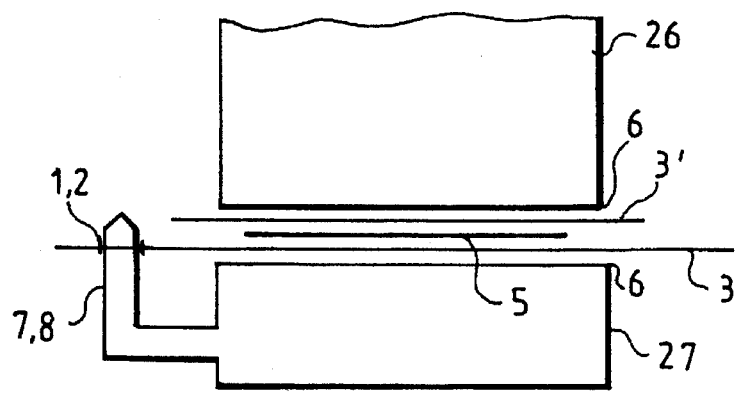

FIG. 2d shows the positioning of the unit constituted by the document 5 and its two covers 3', 3" just before this unit is punched out by a second punch 26 and its associated die 27. The unit 5, 3, 3' is positioned so that the holes 1, 2 made earlier are engaged around pads, of which only one, 7, 8, is shown, the other pad being hidden by this one. These pads have a diameter substantially equal to that of the holes. They are fixed in relation to the projection of the line 6 for the punching out of the unit in a plane perpendicular to the direction of movement of the second punch 26, this punch-out line 6 being defined by the facing edges of the second punch 26 and its die 27. The two pads 7, 8 are, for example, fixedly joined mechanically to this die 27. These two pads act as the above-mentioned second reference markers 7, 8. They have for example a conical tip that can easily get engaged in the holes 1, 2 of the first plastic cover 3. Once the correspondence has been obtained between the holes 1, 2 and the above-mentioned pads 7, 8 by the engagement of the latter in the former, the unit formed by the document 5 and its covers 3, 3' can be punched out. Since the holes 1, 2 and the pads 7, 8 have relative positions with respect to each other that are identical, the positions of the holes 1, 2 and hence of the auxiliary punches 24 with respect to the first punch 22 and the positions of the pads 7, 8 with respect to the first punch 26 or to its associated die 27 are such that they can be used, for example, to obtain even plastic edges around the document 5.

FIGS. 3a and 3b illustrate an exemplary application of the method according to the invention, where the documents 5 to be plastified are affixed one after the other, after having been punched out, to a first plastic band 3 as can be seen in FIG. 3a, the band moving past, for example, under a punching-out system of the type shown in FIG. 2a. Holes 1, 2 are made simultaneously with the fixing of the front of each document 5 to the band. A second plastic band 3' is fixed to the back of the documents 5, covering them without covering the holes 1, 2. These holes are made, for example, according to the above-mentioned method pertaining to FIGS. 2a and 2b.

FIG. 3b shows the punching out of the plastified documents, namely the punching out of the documents 5 and of the plastic bands 3, 3' as shown in FIG. 3a. The punching-out die 27 associated with the second punch 26 is shown above the bands 3, 3', a document 5 being ready to be punched out with the plastic bands 3, 3'. The pads 7, 8, which are fixedly joined mechanically to the die 27 are engaged in the holes associated with the document to be punched out so that, for example, this document is truly centered in the middle of the punch-out line 6. After passing to the level of the die 27, holes 31 appear in the tapes 3, 3' corresponding to the location of the punched out, plastified documents.

Figure 4:
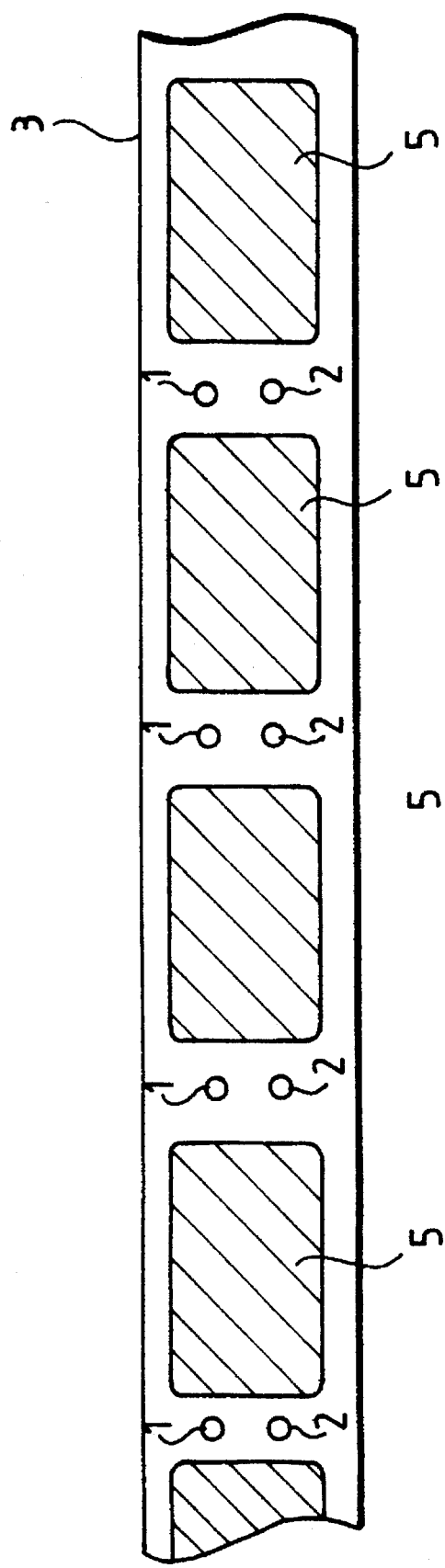

FIG. 4 shows another possible position of the holes 1, 2 on the first plastic band 3. These holes are, for example, made between the documents 5. In this case, the second plastic band 3' has, for example, holes with dimensions greater than the previous holes 1, 2 so that this second band does not cover these holes 1, 2 made in the first band 3.

The holes 1, 2 may again be placed differently on the first plastic band 3. They may notably be placed inside the document 5 if space needs to be gained on the band, for purposes of economy for example.

The method according to the invention can be applied, for example, if a document is plastified on only one face with no second plastic cover being fixed, in this case, to the back of the document. In this case, the plastic cover and the document may be punched out, for example, so that their edges are alongside each other.

The above-mentioned point reference markers 1, 2, 7, 8 may be included, for example, in reference markers that are not limited to points such as holes or circular pads notably. For example, the references 7, 8 may be included in a rectangular sectioned pad and the corresponding reference markers 1, 2 may be included in a rectangular hole matching the shape of the rectangular sectioned pad. The reference markers 1, 2, made in the first plastic cover 3 and the reference markers 7, 8 related to the second punch-out line 6 may therefore be, for example, respectively included in a single reference marker made on the first cover 3 and a single reference marker related to the second punch-out line 6, the plastic document being punched out when these two reference markers alone coincide. However, the fact remains that the coinciding of these two reference markers implies the coinciding of at least two point reference markers of the reference of the cover 3 with at least two point reference markers of the reference that are related to the second punch-out line 8, these point reference markers being well defined, the inclusion of two point reference markers in a single reference marker being done for example for purposes of easy implementation.

What is claimed is:

1. A method for the plastification of a document punched out of a sheet by a first punch and its associated die along a first punch-out line, comprising the steps of:

positioning the document between the first punch and its associated matrix;

punching out the document by passing the first punch through its die, a first plastic cover being in contact with the die to receive the punched out document at the outlet of the die;

moving auxiliary punches towards the first plastic cover simultaneously with the first punch to make at least two holes forming first reference markers in the first plastic cover, the position of the auxiliary punches being determined in a plane perpendicular to the direction of movement of the first punch;

fixing a second plastic cover to the face of the document opposite the first plastic cover, but not covering the first reference markers made on the first plastic cover;

positioning a second punch-out line of the unit constituted by the document and the first and second plastic covers having been defined beforehand in relation to at least two pads;

punching the unit out when the pads are engaged in the holes.

2. A method according to claim 1, wherein the unit is punched out by a second punch penetrating its associated die, the pads being fixedly joined mechanically to this die.

3. A method according to claim 1, wherein the first plastic cover is a first plastic band to which several documents are affixed one after the other.

4. A method according to claim 3, wherein each of the documents have approximately the same dimensions.

5. A method according to claim 1, wherein the holes are made between successive documents undergoing the plastification method.

* * * * *